US008423727B2

(12) United States Patent  (10) Patent No.: US 8,423,727 B2
Matsuzawa et al.  (45) Date of Patent: Apr. 16, 2013

(54) I/O CONVERSION METHOD AND APPARATUS FOR STORAGE SYSTEM

(75) Inventors: Keiichi Matsuzawa, Arlington, MA (US); Yasunori Kaneda, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 465 days.

(21) Appl. No.: 12/724,655

(22) Filed: Mar. 16, 2010

(65) Prior Publication Data
US 2011/0231631 A1  Sep. 22, 2011

(51) Int. Cl.
*G06F 12/10* (2006.01)
(52) U.S. Cl.
USPC .............. 711/156; 711/209; 711/E12.059
(58) Field of Classification Search .............. 711/156, 711/209, E12.059
See application file for complete search history.

(56) References Cited

U.S. PATENT DOCUMENTS

| 6,711,625 | B1* | 3/2004 | Simpson .............. 710/5 |
| 7,330,950 | B2 | 2/2008 | Matsunami et al. |
| 2005/0268067 | A1* | 12/2005 | Lee et al. ............ 711/202 |
| 2006/0227899 | A1* | 10/2006 | Yim ................ 375/316 |
| 2007/0055713 | A1 | 3/2007 | Nagai et al. |

* cited by examiner

*Primary Examiner* — Yong Choe
(74) *Attorney, Agent, or Firm* — Mattingly & Malur, PC

(57) ABSTRACT

An aspect of the invention relates to a method of managing data location of plural files in a storage system having a mixed volume which includes plural pages having a fixed page size, the pages belonging to different tiers. The method comprises mapping pages of different tiers to storage devices of different speeds in the storage system, the storage devices including at least a high speed storage device corresponding to a high tier page and a low speed storage device corresponding to a low tier page; and for each file that is a large file which is larger in size than the page size, performing sub-file tiered management on the large file to assign the large file among pages of different tiers according to access characteristics of different portions of the large file by matching the access characteristics of each portion of the large file with a corresponding tier of the assigned page of the mixed volume.

20 Claims, 23 Drawing Sheets

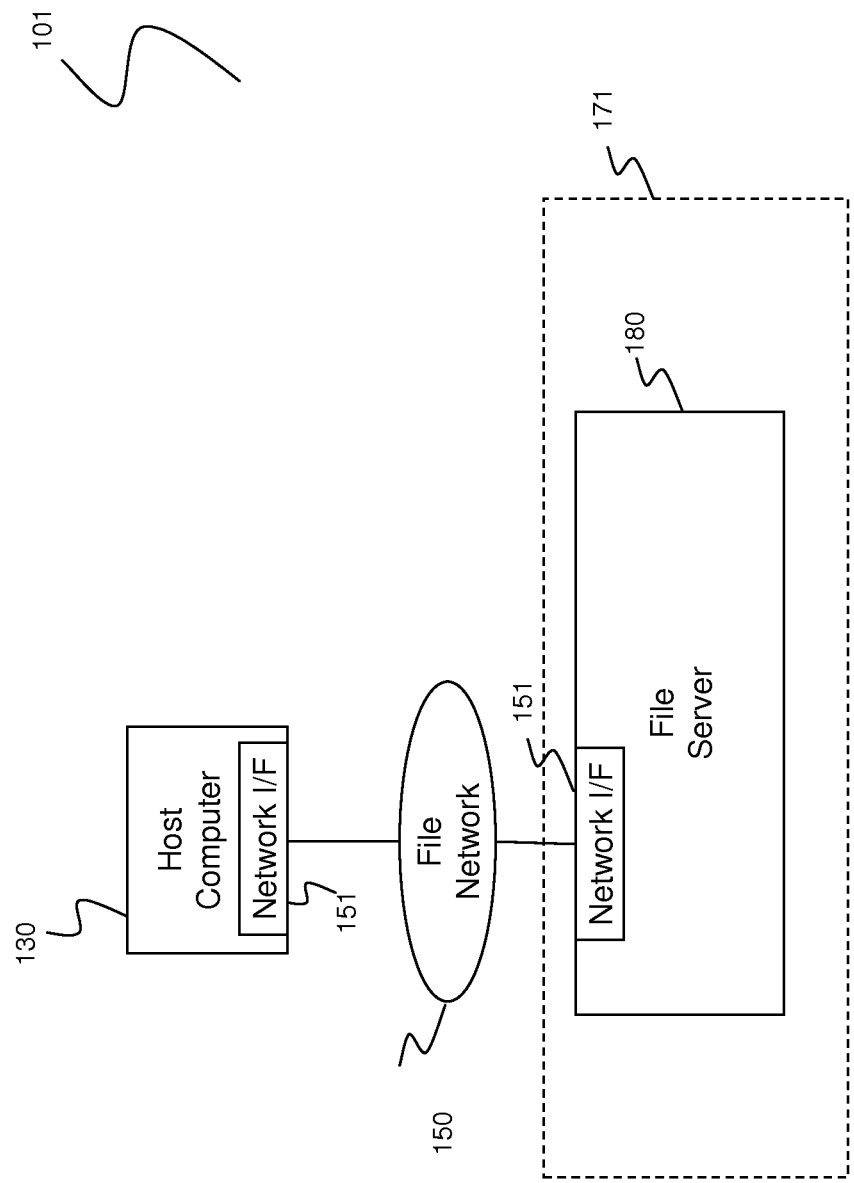

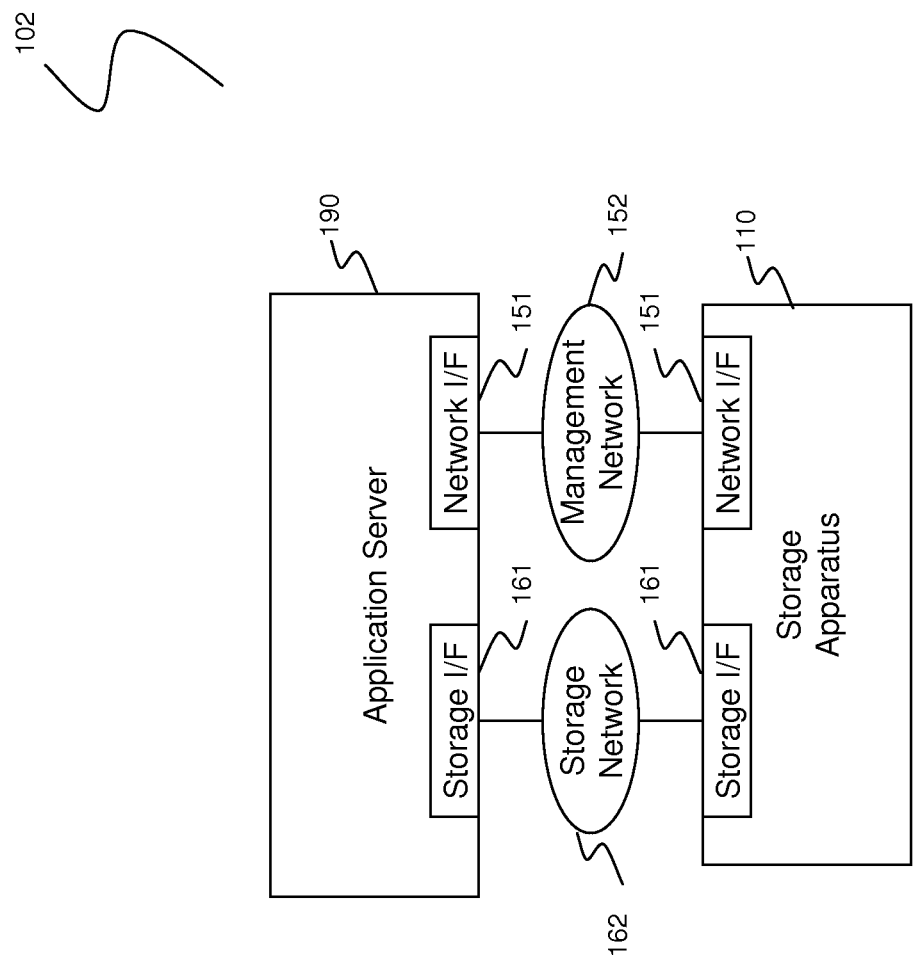

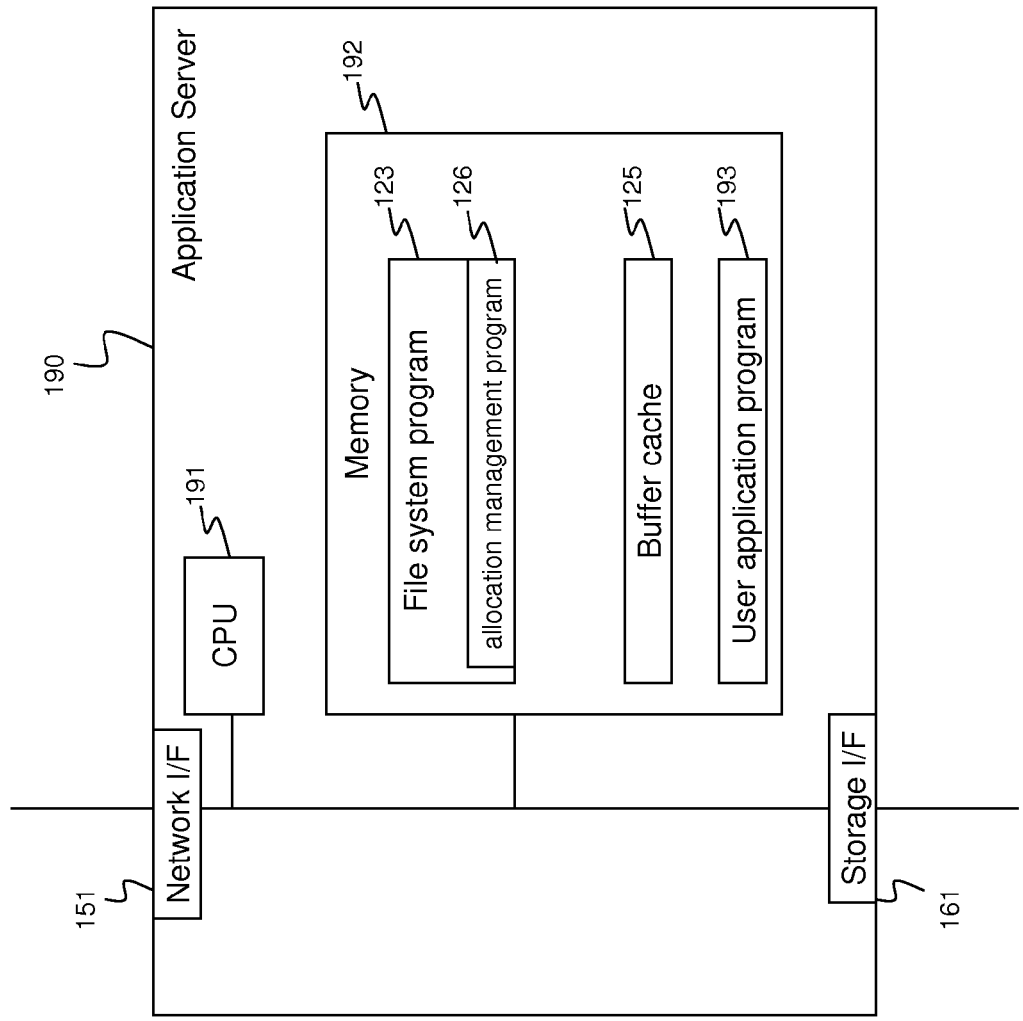

Fig. 3

PAGE MAPPING TABLE 300

| Volume ID 310 | Page Offset 320 | Length 330 | Disk ID 340 | Disk Offset 350 |
|---|---|---|---|---|
| 1 | 0 | 80 | 1 | 50 |
| 1 | 80 | 30 | 3 | 10 |
| 1 | 110 | 40 | 2 | 30 |
| 2 | 0 | 50 | 1 | 0 |

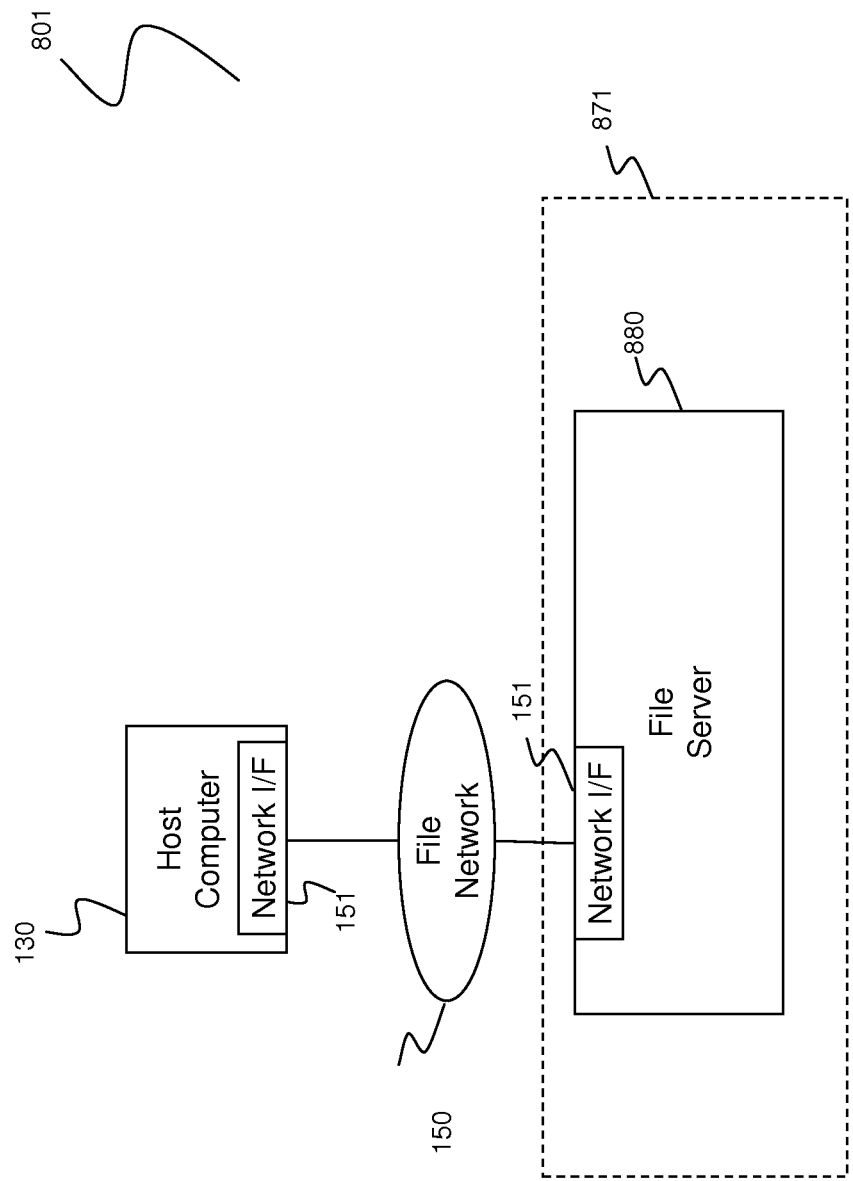

I/O CONVERSION METHOD AND APPARATUS FOR STORAGE SYSTEM

BACKGROUND OF THE INVENTION

The present invention relates generally to methods and apparatus for managing the data location in a storage system. More particularly, the storage apparatus of the system has a page allocation capability with which the storage apparatus allocates a page to a logical volume from a page pool, and the file server in this system has a capability to manage the page allocation in the storage system and the file server enables per-file hierarchical storage management.

Tiered storage is a functionality to assign data to different types of storage media. This functionality is used to maximize performance and reduce cost of the storage system. For example, the storage system capable for tiered storage assigns data which is accessed frequently to the fast but expensive storage media and assigns data which is rarely accessed to the slow but cheap storage media. This configuration is cheaper than the configuration in which the entire data is stored on the fast, expensive media.

To implement the tiered storage functionality in the storage system, a page-mapping table is used. This table describes the relations between pages, which mean fixed-size data area, and their locations. In this way, when the page size is small, the effectiveness for data assignment and cost reduction is improved. However, a smaller page requires more page-mapping table entries and more memory on the storage system.

When we assume the file server uses the storage system to store the file data thereto, each file size is different and variable and cannot always be aligned with the page boundary. Each page can store some small files and one huge file is stored on multiple pages. Usually the access frequency to each small file stored on the same page is different so that the tiered storage functionality does not work well for such situations and the effectiveness is diminished.

BRIEF SUMMARY OF THE INVENTION

Exemplary embodiments of the invention provide methods and apparatus for controlling the page and file allocation to each storage media in the storage system. This invention is used for the storage system apparatus and the file server in controlling data allocation for different kinds of storage media. In specific embodiments, the inventive technique enables both per-file HSM (Hierarchical Storage Management) and page-based (sub-file) TSM (Tiered Storage Management). As a result, it increases the effectiveness for performance and cost reduction of tiered storage functionality.

The file server and the storage apparatus communicate with each other to adjust the page-mapping table. The file server knows which area of the volume is assigned to which storage media, so that the file server allocates small files onto the corresponding area. When the file server stores larger files than the page size, the file server allocates such files somewhere on the volume and gives information to the storage apparatus that these areas are under control of the storage apparatus, and the storage apparatus can assign pages on the storage media by itself.

An aspect of the present invention is directed to a method of managing data location of a plurality of files in a storage system having a mixed volume which includes a plurality of pages having a fixed page size, the pages belonging to different tiers. The method comprises mapping the pages of different tiers to storage devices of different speeds in the storage system, the storage devices of different speeds including at least a high speed storage device corresponding to a high tier page and a low speed storage device corresponding to a low tier page; and for each file that is a large file which is larger in size than the page size, performing sub-file tiered management on the large file to assign the large file among pages of different tiers according to the access characteristics of different portions of the large file by matching the access characteristics of each portion of the large file with a corresponding tier of the assigned page of the mixed volume.

In some embodiments, the method further comprises, for each file that is a small file which is not larger in size than the page size, assigning the small file to a page of the plurality of pages which belongs to a corresponding tier that matches the access characteristics of the small file. The storage system further has a plurality of specific speed volumes including at least one high speed volume and at least one low speed volume, and the method further comprises mapping each high speed volume to one or more high speed storage devices; mapping each low speed volume to one or more low speed storage devices; and for each file that is a small file which is not larger in size than the page size, assigning the small file to a specific speed volume by matching the access characteristics of the small file with a corresponding speed of the specific speed volume. The plurality of specific speed volumes include at least one medium speed volume, and the method further comprises mapping each medium speed volume to one or more medium speed storage devices.

In specific embodiments, the plurality of storage devices include at least one medium speed storage device, and mapping the pages of different tiers to storage devices of different speeds in the storage system include mapping at least one page to a medium speed storage device. The access characteristics comprise access frequency; and matching the access characteristics of each portion of the large file with a corresponding tier of the assigned page of the mixed volume comprises matching high access frequency with a corresponding high tier page which is mapped to a high speed storage device, and matching low access frequency with a corresponding low tier page which is mapped to a low speed storage device. The method may further comprise determining whether the files are small files or large files.

Another aspect of the invention is directed to a system including a host coupled with a storage system for managing data location of a plurality of files in the storage system having a mixed volume which includes a plurality of pages having a fixed page size, the pages belonging to different tiers. The storage system comprises a plurality of storage devices of different speeds including at least a high speed storage device corresponding to a high tier page in the mixed volume and a low speed storage device corresponding to a low tier page in the mixed volume; a mixed volume including a plurality of pages of different tiers; and a file server having a processor and a memory, and being configured to map the pages of different tiers to map the pages of different tiers to storage devices of different speeds in the storage system; and for each file that is a large file which is larger in size than the page size, perform sub-file tiered management on the large file to assign the large file among pages of different tiers according to the access characteristics of different portions of the large file by matching the access characteristics of each portion of the large file with a corresponding tier of the assigned page of the mixed volume.

In some embodiments, the file server includes an allocation management module which is configured to, for each file that is a small file which is not larger in size than the page size, assign the small file to a page of the plurality of pages which belongs to a corresponding tier that matches the access characteristics of the small file. The storage system further has a plurality of specific speed volumes including at least one high speed volume and at least one low speed volume; and the file server includes a file-level hierarchical storage management module which is configured to map each high speed volume to one or more high speed storage devices; map each low speed volume to one or more low speed storage devices; and for each file that is a small file which is not larger in size than the page size, assign the small file to a specific speed volume by matching the access characteristics of the small file with a corresponding speed of the specific speed volume. The plurality of specific speed volumes include at least one medium speed volume; and the file-level hierarchical storage management module is configured to map each medium speed volume to one or more medium speed storage devices. The file server may be configured to determine whether the files are small files or large files.

Another aspect of the invention is directed to a computer-readable storage medium storing a plurality of instructions for controlling a data processor to manage data location of a plurality of files in a storage system having a mixed volume which includes a plurality of pages having a fixed page size, the pages belonging to different tiers. The storage system has a plurality of storage devices of different speeds including at least a high speed storage device corresponding to a high tier page in the mixed volume and a low speed storage device corresponding to a low tier page in the mixed volume. The plurality of instructions comprise instructions that cause the data processor to map the pages of different tiers to map the pages of different tiers to storage devices of different speeds in the storage system; and instructions that, for each file that is a large file which is larger in size than the page size, cause the data processor to perform sub-file tiered management on the large file to assign the large file among pages of different tiers according to the access characteristics of different portions of the large file by matching the access characteristics of each portion of the large file with a corresponding tier of the assigned page of the mixed volume.

These and other features and advantages of the present invention will become apparent to those of ordinary skill in the art in view of the following detailed description of the specific embodiments.

BRIEF DESCRIPTION OF THE DRAWINGS

FIGS. 1(d) and 1(e) illustrate another example of a hardware configuration of an information system.

FIGS. 1(f) and 1(g) illustrate another example of a hardware configuration of an information system.

FIG. 3 shows an example of a page mapping table.

FIGS. 8(c) and 8(d) show another example of a hardware configuration of an information system.

DETAILED DESCRIPTION OF THE INVENTION

Figure 1A:
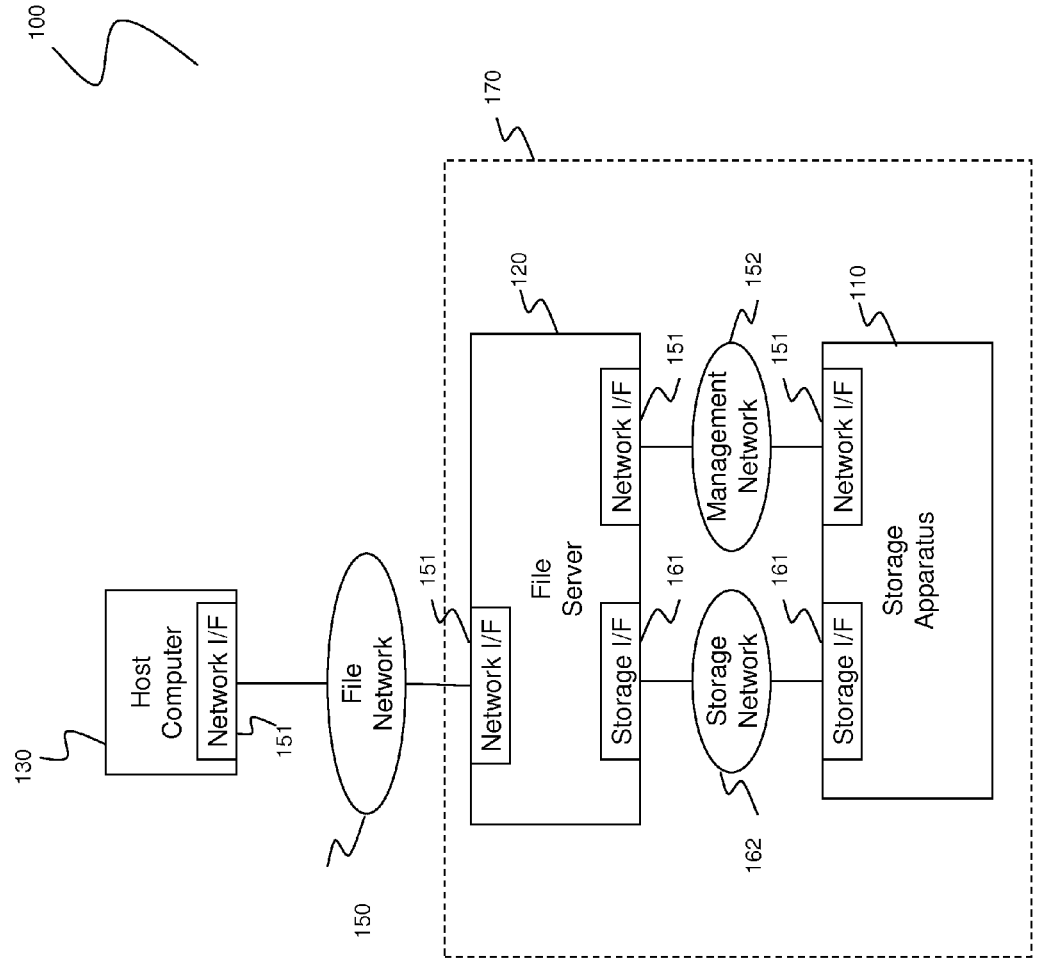
FIGS. 1(a), 1(b), and 1(c) illustrate an example of a hardware configuration of an information system in which the method and apparatus of the invention may be applied according to a first embodiment of the invention.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for controlling the page and file allocation to each storage media at the storage system.

I. First Embodiment

A. System Configuration

Figure 1B:
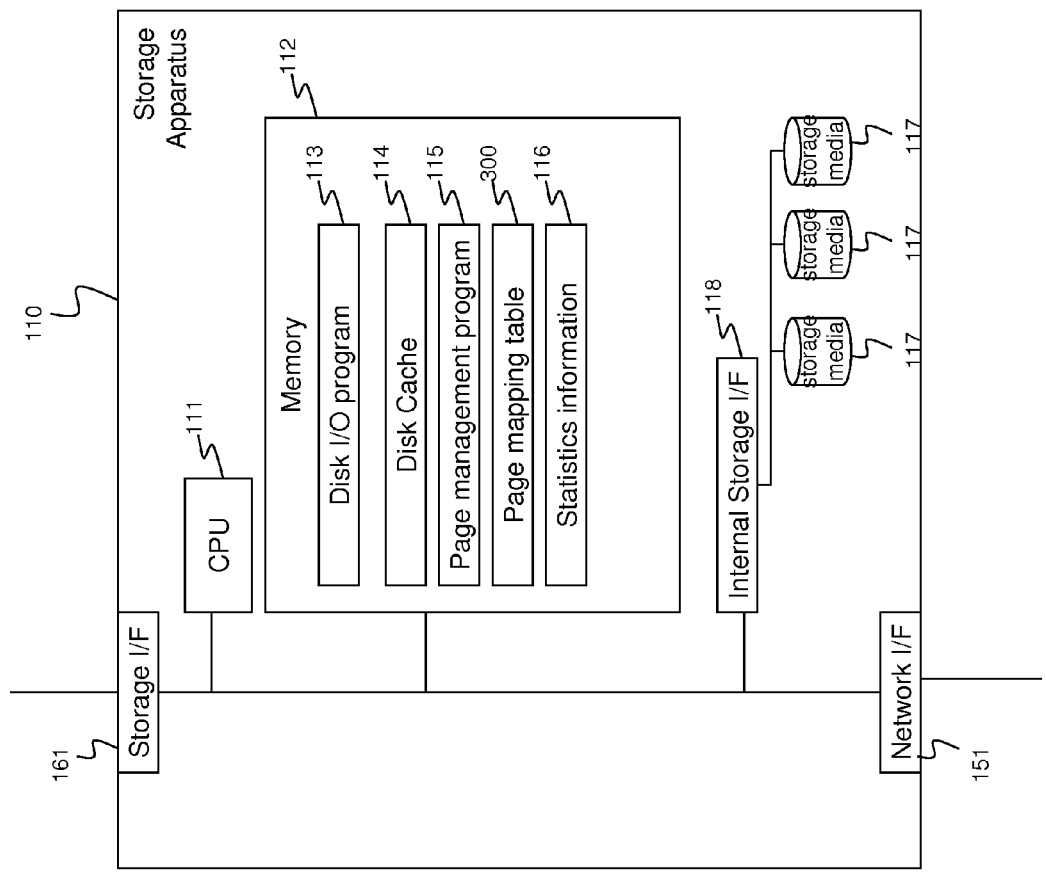
Figure 1C:
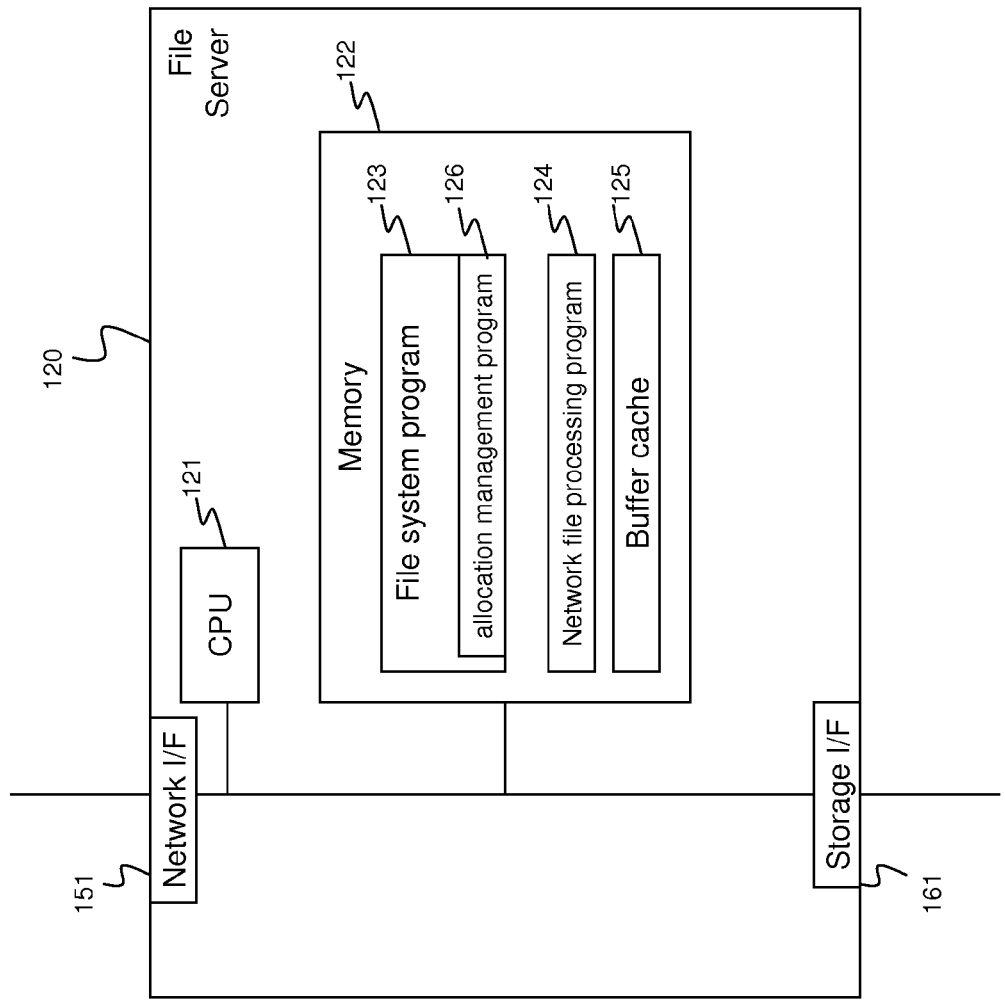

FIGS. 1(a), 1(b), and 1(c) illustrate an example of a hardware configuration of an information system in which the method and apparatus of the invention may be applied according to a first embodiment of the invention. The information system 100 includes a storage system 170, a storage network 162, a file network 150, a management network 152, and one or more host computers 130.

The storage system 170 includes at least one storage apparatus 110 and at least one file server 120. The storage apparatus 110 and the file server 120 communicate via the management network 152 for management information and the storage network 162 for data I/O (input/output). The host computers 130 issues I/O requests to the file server 120 via the file network 150.

The storage apparatus 110 includes a CPU (Central Processing Unit) 111, a memory 112, an internal storage interface 116, at least one storage media 117, a storage interface 161, and a network interface 151. The CPU 111 controls the devices in the storage apparatus 110 as the programs in memory 112 show. The memory 112 stores programs, tables, and cache. The CPU 111 processes I/O requests received from the file server 120 via the storage interface 161 by executing a disk I/O program 113. In the disk I/O process, the CPU 111 executing the disk I/O program 113 determines the location of the requested data by referring to the page mapping table 200. The CPU 111 uses some area of the memory 112 as a disk cache 114 and stores some data on the disk cache 114 to hide the latency to access the storage media 117 and respond to I/O requests quickly. The statistics information 116 stores the information about the amount of I/O, CPU load, and so on. The page management program 115 manages the page table 600 entries by referring to the statistics information and requests from the file server 120 via the network interface 151. The storage apparatus 110 has at least one storage media 117. The CPU 111 can read/write data from/onto the storage media 117 through an internal storage interface 118. FC (Fibre Channel), SATA (Serial Attached Technology Attachment), SAS (Serial attached SCSI), IDE (Integrated Device Electronics), or other interfaces are used to access the storage media 117. The storage apparatus can use a variety of kinds of storage media 117 such as HDD (Hard Disk Drive), SSD (Solid State Drive), flush memories, optical disks, magnetic tapes, and so on. Their array by RAID (Redundant Array of Independent Disk) technology is also available for the storage media 117. Furthermore, the storage apparatus 110 can use another storage apparatus as the storage media 117.

The file server 120 includes a CPU 121, a memory 122, and a network interface 151. The CPU 121 controls the devices in the file server 120 as the programs in memory 122 show. The memory 122 has programs and cache. The CPU 121 processes file I/O requests and reads/writes data from/onto the storage apparatus 110 connected via the storage interface 160 by referring to the file system program 123. The CPU 121 receives file I/O requests from the external computers via the network interface 161 and redirects the I/O requests to the file system program 123 by referring to the network file processing program 124. The CPU 121 uses some area of the memory 112 as the buffer cache 125. The buffer cache 125 stores data to reduce I/O to the storage apparatus 110 and accelerate file I/O.

By using the storage interface 161, the file server 120 and the storage apparatus 110 communicate for data I/O via the storage network 162. There are some common storage protocols for the storage interface 161 and the storage network 162 such as FC (Fibre Channel), iSCSI (Internet Small Computer System Interface), FCoE (FC over Ethernet), and so on. The host computers 130 issue file I/O to the file server 120 via the file network 150 by using the network interface 151. There are some common protocol for file I/O interface via the file network 150 such as NFS (Network File System), CIFS (Common Internet File System), and AFP (Apple Filing Protocol). Furthermore, each computer can communicate with other computers for various purposes. The file server 120 and the storage apparatus 110 communicate via the management network 152 by using the network interface 151. The file server 120 uses this network 152 to get page allocation information and provide area information to the storage apparatus 110. The host computer 130 is the user of the storage system 170. The host computer 130 issues I/O by using the network interface 151 via the file network 150.

Figure 1E:
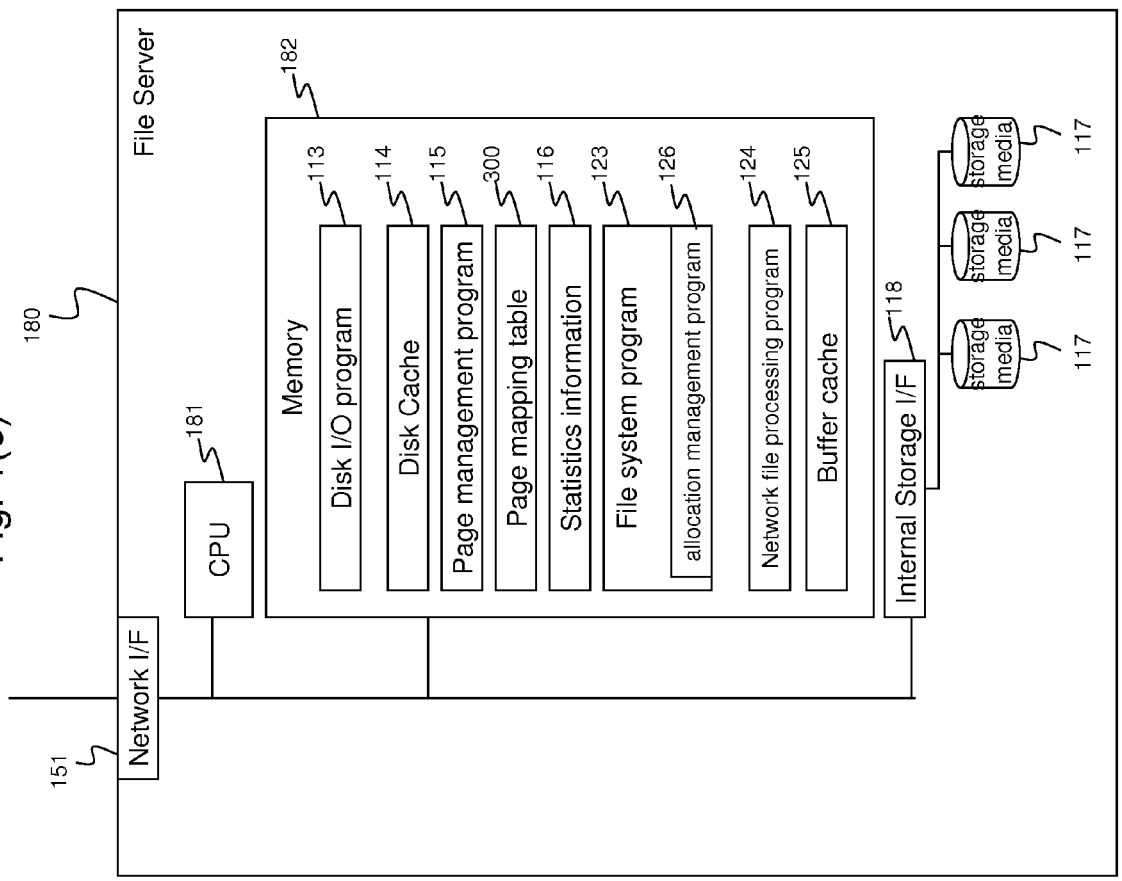

FIGS. 1(d) and 1(e) illustrate another example of a hardware configuration of an information system 101. The storage system 171 includes a file server 180. This file server 180 has capabilities of both the file server 120 and the storage apparatus 110 of FIGS. 1(a)-1(c). That is to say, the memory 182 of the file server 180 stores the disk I/O program 113, page management (or mapping) program 115, page mapping table 300, file system program 123, allocation management program 126, and network file access program 124. Furthermore, this file server 180 has its own internal storage interface 118 and stores data on the internal storage apparatus 117.

FIGS. 1(f) and 1(g) illustrate another example of a hardware configuration of an information system. The information system 102 includes an application server 190 and the storage apparatus 110. The application server 190 has a user application program 193 in its memory 190 with file system program 123 and allocation management program 126.

The first embodiment is applicable for all of the storage system 170 of FIGS. 1(a)-1(c), the storage system 171 of FIGS. 1(d) and 1(e), and the information system 102 of FIGS. 1(f) and 1(g).

B. Sector

Figure 2A:
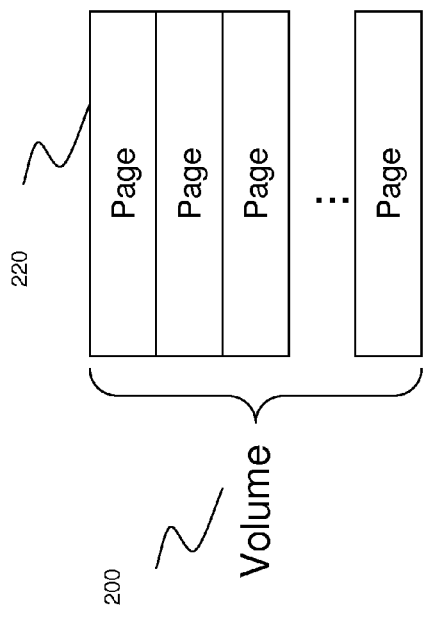
FIG. 2(a) illustrates the different levels of block size.

FIG. 2(a) illustrates the different levels of block size. A "Sector" 210 is the minimum size and common unit between the file server 120 and storage apparatus 110. For example, the sector size in SCSI (Small Computer System Interface) is 512 bytes. For the file server 120, a "Volume" 200 looks like an array of sectors. The file server 120 issues I/O by specifying a target volume 200, the start sector of the volume 200, and the number of sectors 210 to read from or write onto.

C. Page-Based Tiered Storage

"Tiered storage" is a functionality to assign data to different types of storage media. This functionality is used to maximize performance and reduce cost of the storage system. For example, the storage system capable of tiered storage assigns data which is accessed frequently to the fast but expensive storage media and data which is rarely accessed to the slow but cheap storage media. This configuration is cheaper than the configuration with which the entire data is stored on the fast expensive media.

Figure 2B:
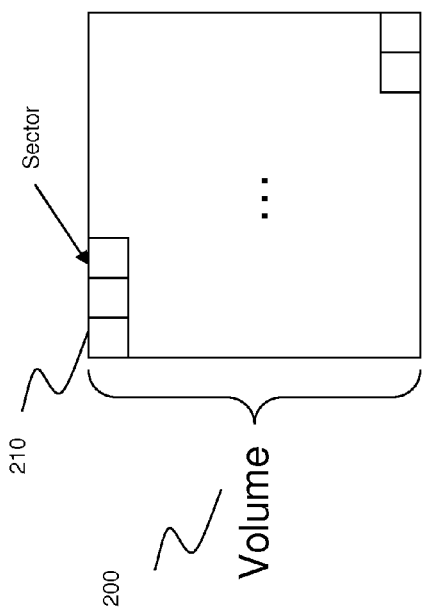
FIGS. 2(b) and 2(c) illustrate the concept of "Page."
Figure 2C:
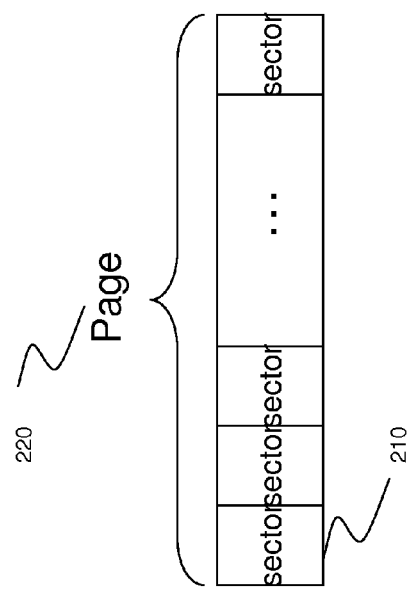

Page-based tiered storage is one implementation to realize tiered storage. FIGS. 2(b) and 2(c) illustrate the concept of "Page." For the storage apparatus 110, the volume 200 has an array of "pages" 220. A page 220 has sectors and each page has the same size. Page-based tiered storage enables tiered storage by mapping sectors to various storage media 117 per page. The page management program 115 and the page mapping table 300 execute the mapping process actually.

FIG. 3 shows an example of a page mapping table 300. The page mapping table 300 describes the relationship between volumes that are accessible from the file server 120. Each row 370, 371, 372 and 373 of the page mapping table 300 shows the information for a "chunk" (array of successive pages). Volume ID 310 stores the ID of the volumes. Page offset 320 stores the offset of volumes that each entry implies. Length 330 shows the length of the pages that is specified at each entry. Disk ID 340 shows the unique ID to specify a storage media 117 to assign the page data. Disk offset 350 shows the offset of storage media 117 for this page.

Figure 4:
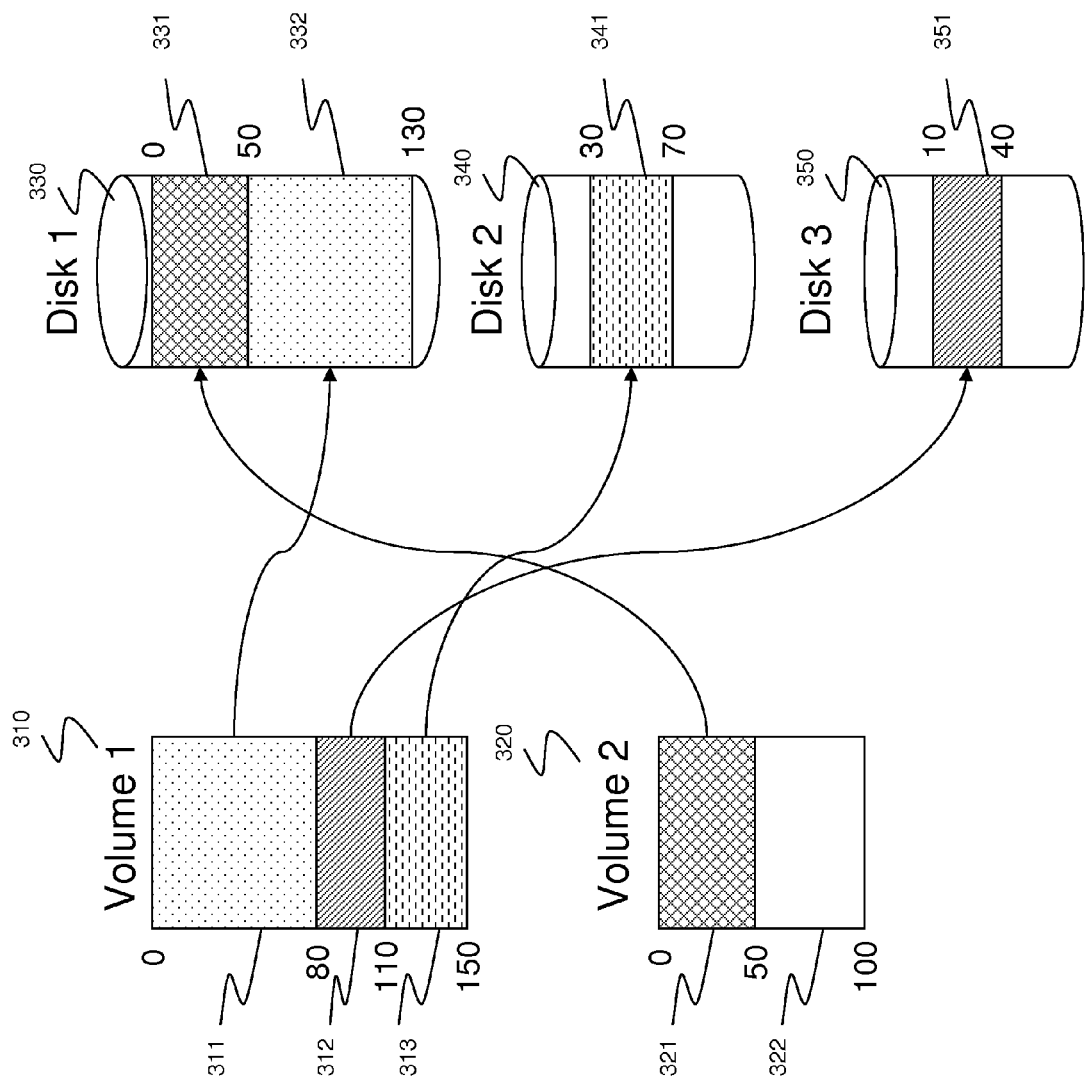
FIG. 4 illustrates the mapping configuration which the page mapping table indicates.

FIG. 4 illustrates the mapping configuration which the page mapping table 300 indicates. "Volume 1" 310 has three chunks 311, 312, 313. Chunk 311 is mapped to chunk 332 of "disk 1" 330, chunk 312 is mapped to chunk 351 of "disk 3" 350, and chunk 313 is mapped to chunk 341 of "disk 2" 340. Not all chunks of each volume need to be mapped to disk. For example, chunk 322 is not mapped to any disk. If the file server 120 issues an I/O request on this chunk 322, the storage apparatus 110 returns an error-code or allocate a disk space on the chunk. Either way is all right and it depends on the configuration. Furthermore, allocating more than 2 chunks of volumes to the same chunk of disk is acceptable. These characteristics also enable thin provisioning and de-duplication implementation.

The page management program 115 can modify the page mapping table 300 as the access frequency changes, additional storage media 117 is installed, or some other event occurs. For example, the page management program 115 moves pages accessed not so often to the slower (but cheaper) storage media 117 by referring to the statistics information 116. Page size is an important parameter for this tiered storage. When the page size is smaller, each data is allocated to the appropriate storage media 117 and thus the effectiveness of cost-reduction gets better but the number of entries of the page mapping table 300 becomes larger and the storage apparatus needs much more memory.

D. Tier-aware File Allocation

The file system program 123 manages volumes on the storage apparatus 110 and stores many files on the volumes. Traditionally, the page mapping process is done inside the storage apparatus 110 and hence the file system program 123 does not know the page mapping.

Figure 5:
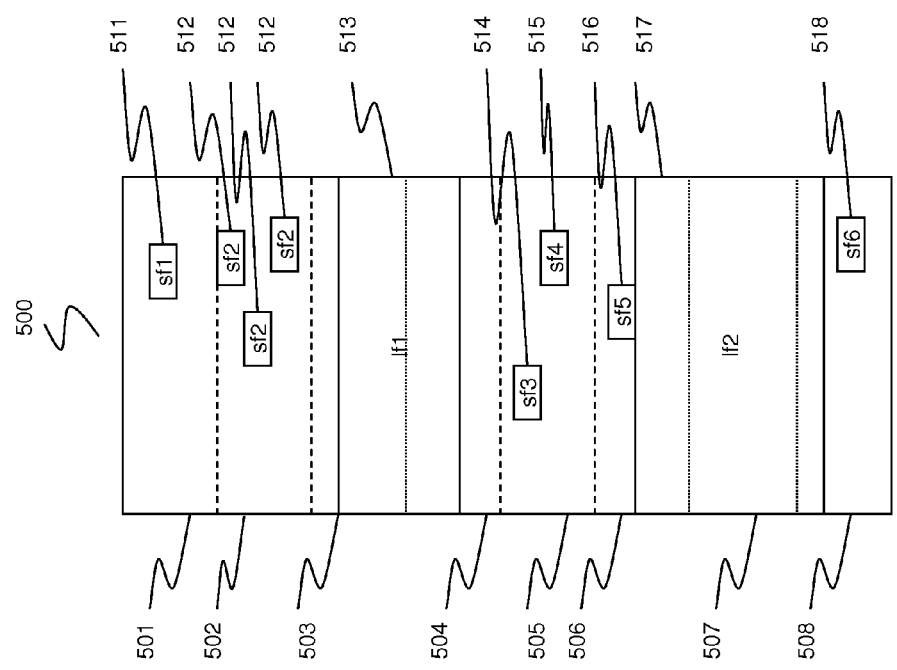
FIG. 5 illustrates an example of the usage of a part of the volume for a file system.

FIG. 5 illustrates an example of the usage of a part of the volume 500 for a file system. The volume 500 consists of pages 501-508. The file system program 123 stores a number of files 511-518 on the volume 500. Now we assume file "sf1" 511, "sf3" 513 and "sf5" 516 are often accessed and require high performance, file "sf4" 515 and "sf6" 518 are sometimes accessed and require medium-speed storage media, and files "sf2" 512 are seldom accessed and these files can accept to be on the slow (but cheap) storage media 117. Page 501 stores only one small file "sf1" 511 and page 501 should be assigned to the fast storage apparatus 117. Page 502 stores files "sf2" 512. The data on page 502 are seldom accessed so that page 502 can be assigned to the slow (but cheap) storage media 117. File "lf1" 513 is larger than one page and located on both page 503 and page 504. In this case, page-based tiered management works well because data on page 503 and page 504 have the same characteristics.

However, page-based tiered management does not work effectively in some situation. Page 505 stores two small files "sf3" 513 and "sf4" 514 and these files have different access frequencies. Accordingly, the data of these files should be assigned to different storage media 117 but page-based tiered management cannot handle this case well. Page 506 stores a small file "sf5" 516 and a part of a large file "lf2" 517. Page 507 stores the rest of the file 517 and a small file "sf6" 518. When the small files 516 and 518 are often accessed, these pages 506 and 508 must be assigned to the fast storage media 117. Thus, even if the large file "lf2" 517 is hardly accessed, the file consumes the volume of the fast storage media 117.

In this situation, this invention reveals tier-aware file allocation. The allocation management program 126 in the file server 120 handles the page-based tiered management in the storage apparatus 110 via the management network 152. The allocation management program 126 executes two processes. First, the allocation management program 126 gets allocation information from the page management program 115 of the storage apparatus 115. Second, the allocation management program 126 specifies the page assignment for the page management program 115.

Figure 6:
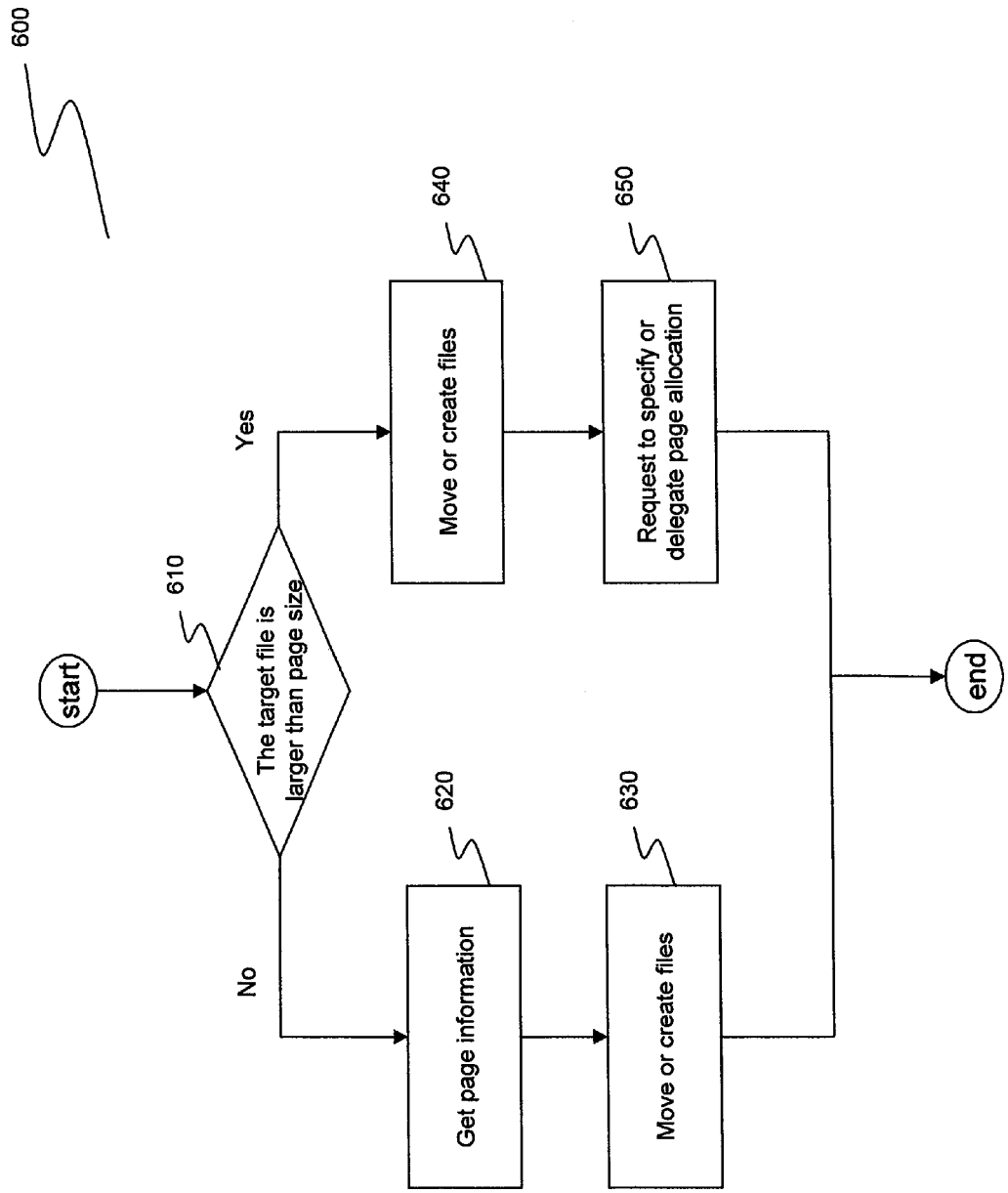
FIG. 6 shows an example of a flow diagram illustrating the tier-aware file allocation flow.

FIG. 6 shows an example of a flow diagram illustrating the tier-aware file allocation flow 600. The allocation management program 126 can execute this flow 600 when events such as file creation or file write occur, periodically or at some other timing. The allocation management program 126 checks if the target file is larger than the page size or not (step 610). When the file is smaller than the page size, the allocation management program 126 gets the page allocation information from the page management program 115 of the storage apparatus 110 (step 620). Then the allocation management program 126 allocates the appropriate page for the file and moves or creates the file onto the page (step 630). For example, the allocation management program 126 allocates files accessed often on to the pages assigned to fast storage media 117. If the allocation management program 126 can find space on the appropriate page, the allocation management program 126 uses that space. If not, the allocation management program 126 requests the page management program 115 to assign pages onto the appropriate storage media 117.

If the target file is larger than the page size, first, the allocation management program 126 allocates and moves or creates the file on the volume (step 640). If the file is aligned to the page size boundary, pages of this file except the last page are occupied by only the large target file and the effectiveness of tiered management is improved. Then the allocation management program 126 issues requests for the page management program 115 (step 650). The allocation management program 126 can request to specify each page assignment of the large file if the allocation management program 126 has enough information to assign or delegate page assignments to the page management program 115. If the allocation management program 126 delegates page assignments, the page management program 115 can handle page assignment appropriately. After the flow 600, the allocation management program 126 finishes allocating both small and large files on appropriate pages on appropriate storage volume 117. Furthermore, this flow 600 enables sub-file tiered management for large files because each page of the large files can be independently assigned to different storage media 117.

Figure 7:
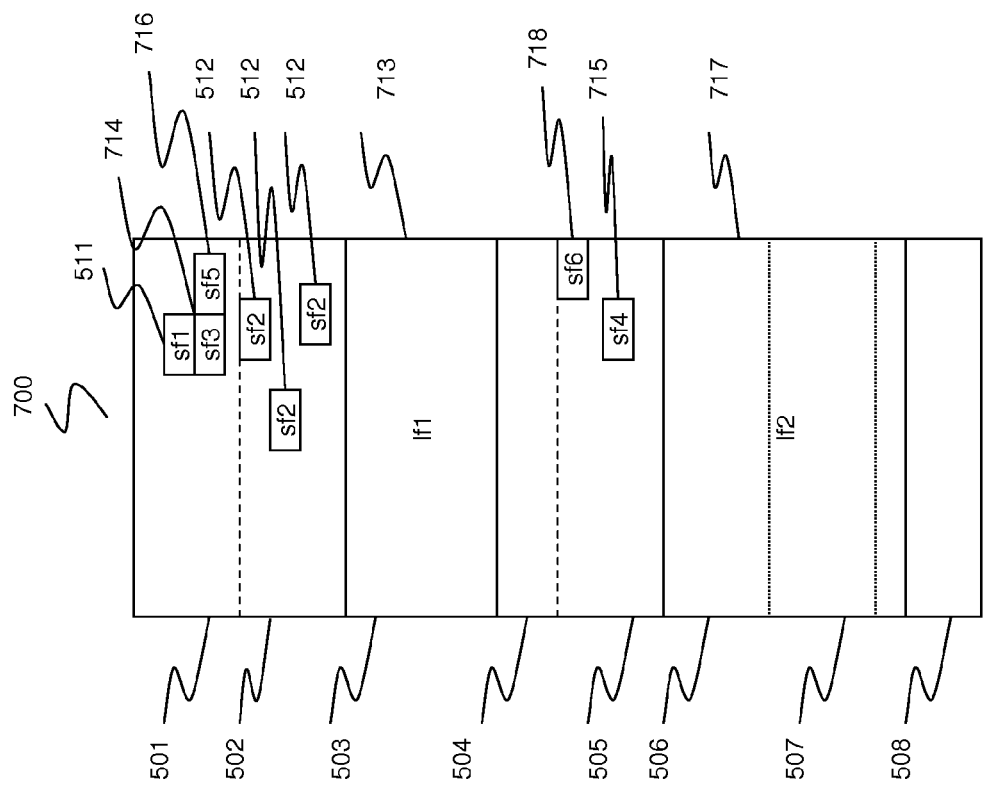
FIG. 7 shows one example of a result of tier-aware file allocation.
Figure 8A:
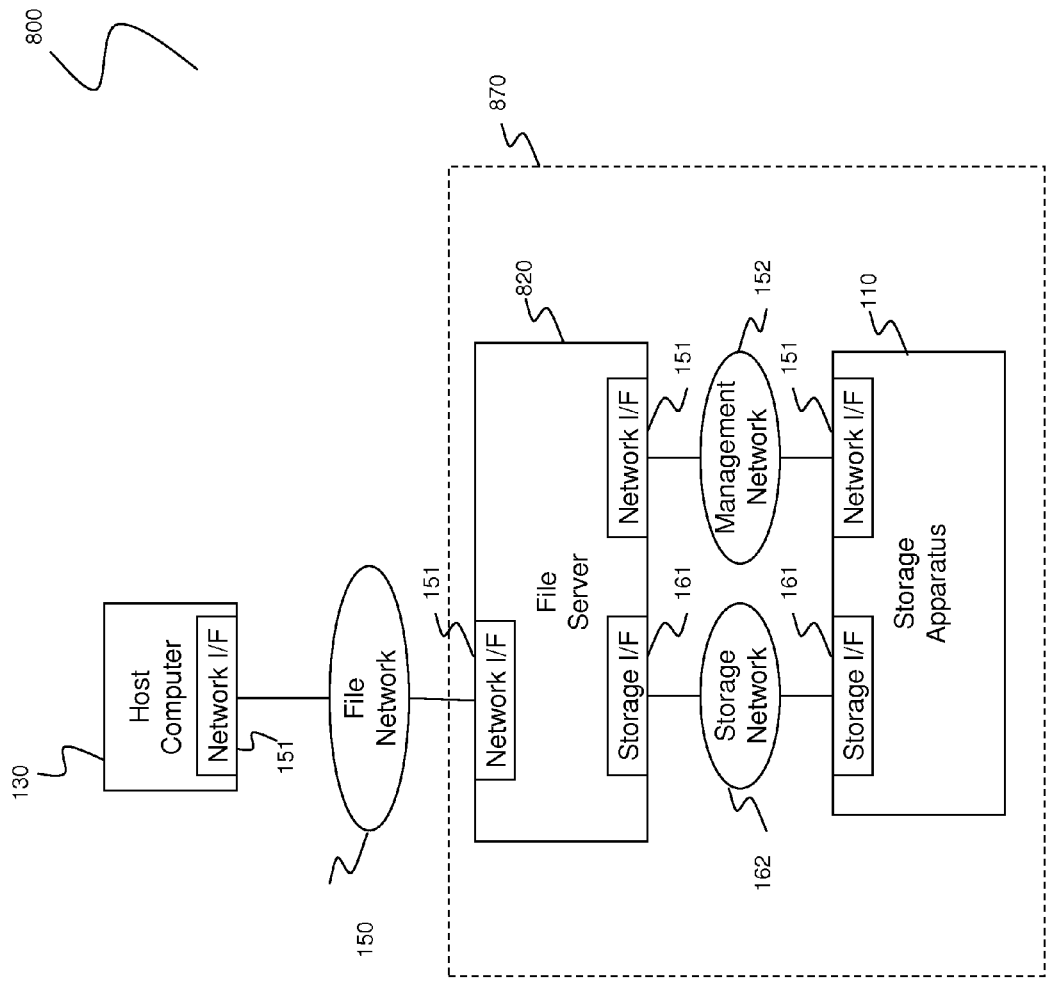
FIGS. 8(a) and 8(b) illustrate an example of a hardware configuration of an information system in which the method and apparatus of the invention may be applied according to a second embodiment of the invention.
Figure 8B:
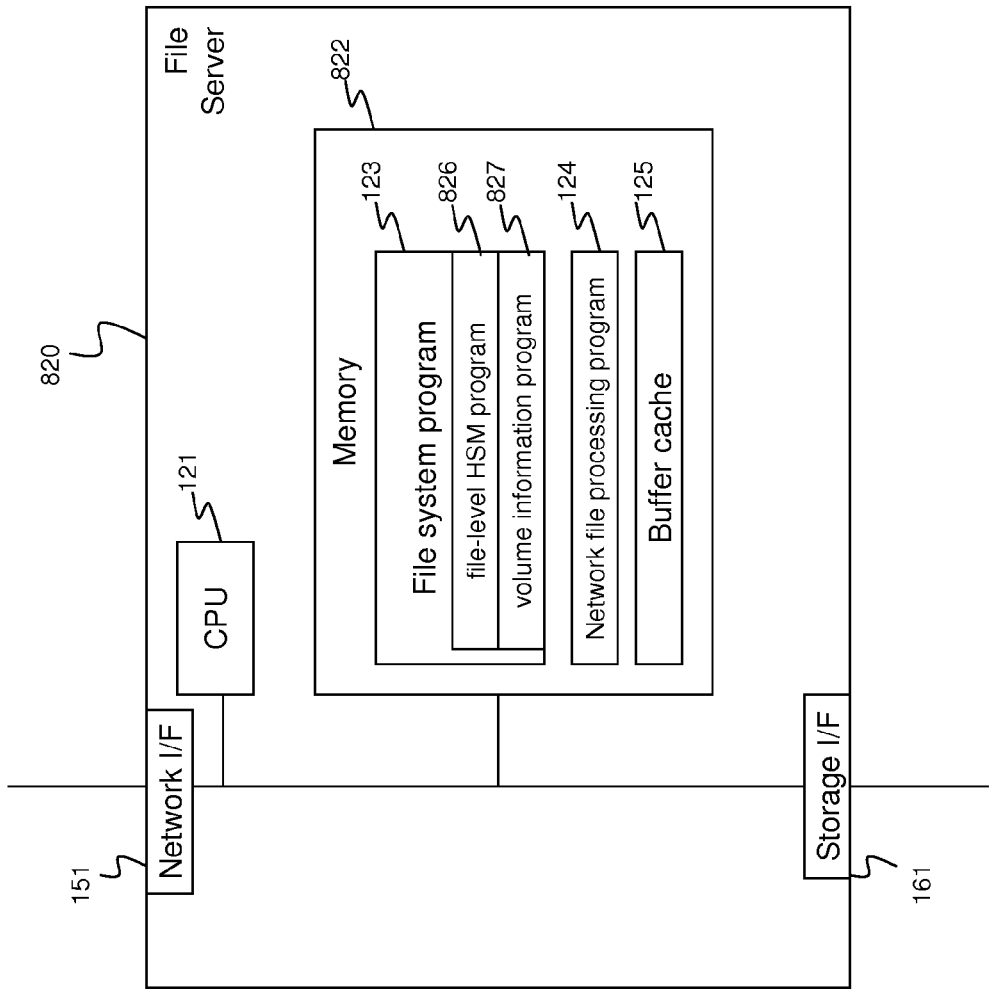
Figure 8D:
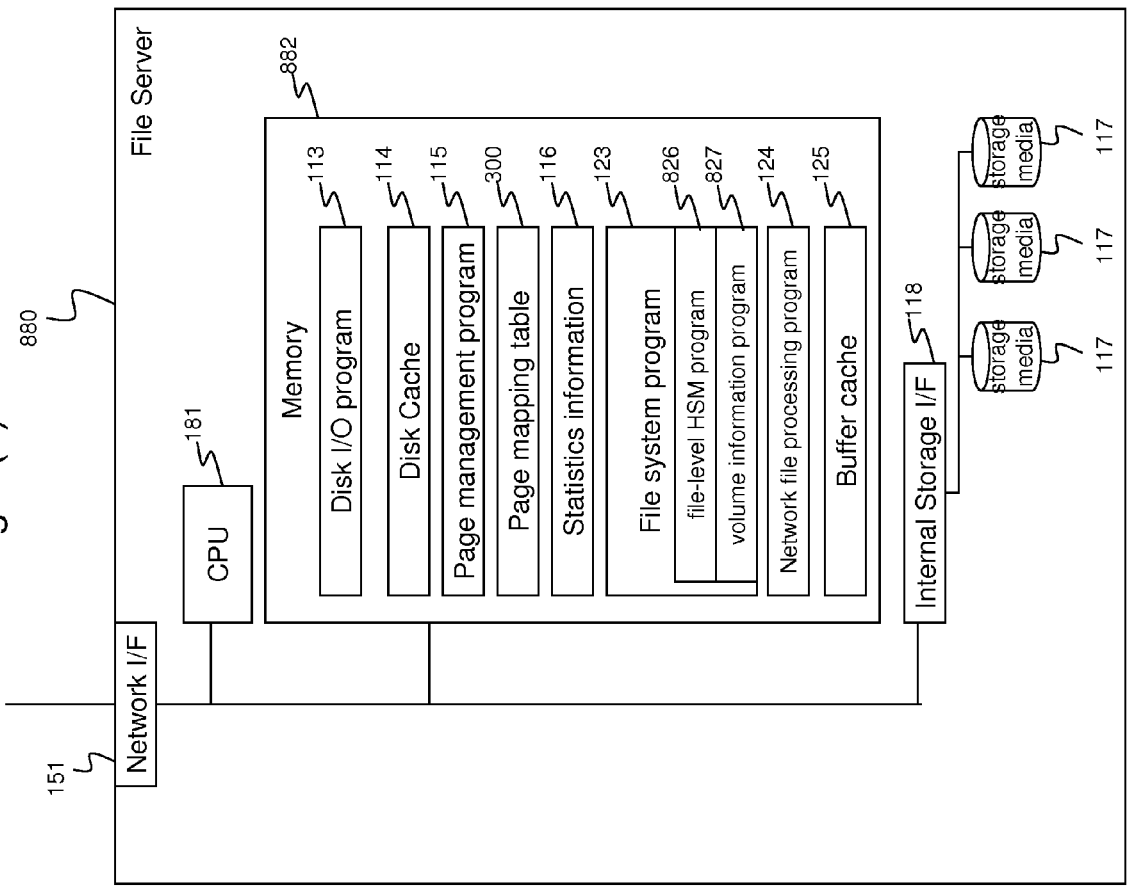
Figure 8E:
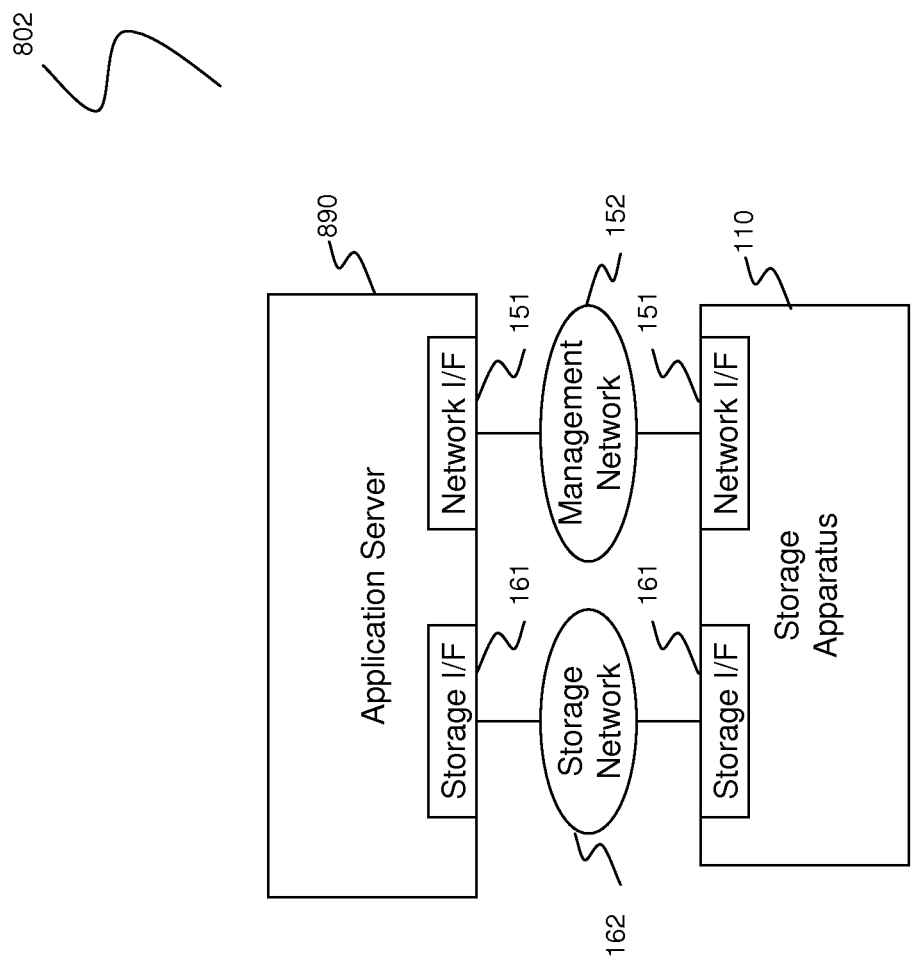
FIGS. 8(e) and 8(f) show another example of a hardware configuration of an information system.
Figure 8F:
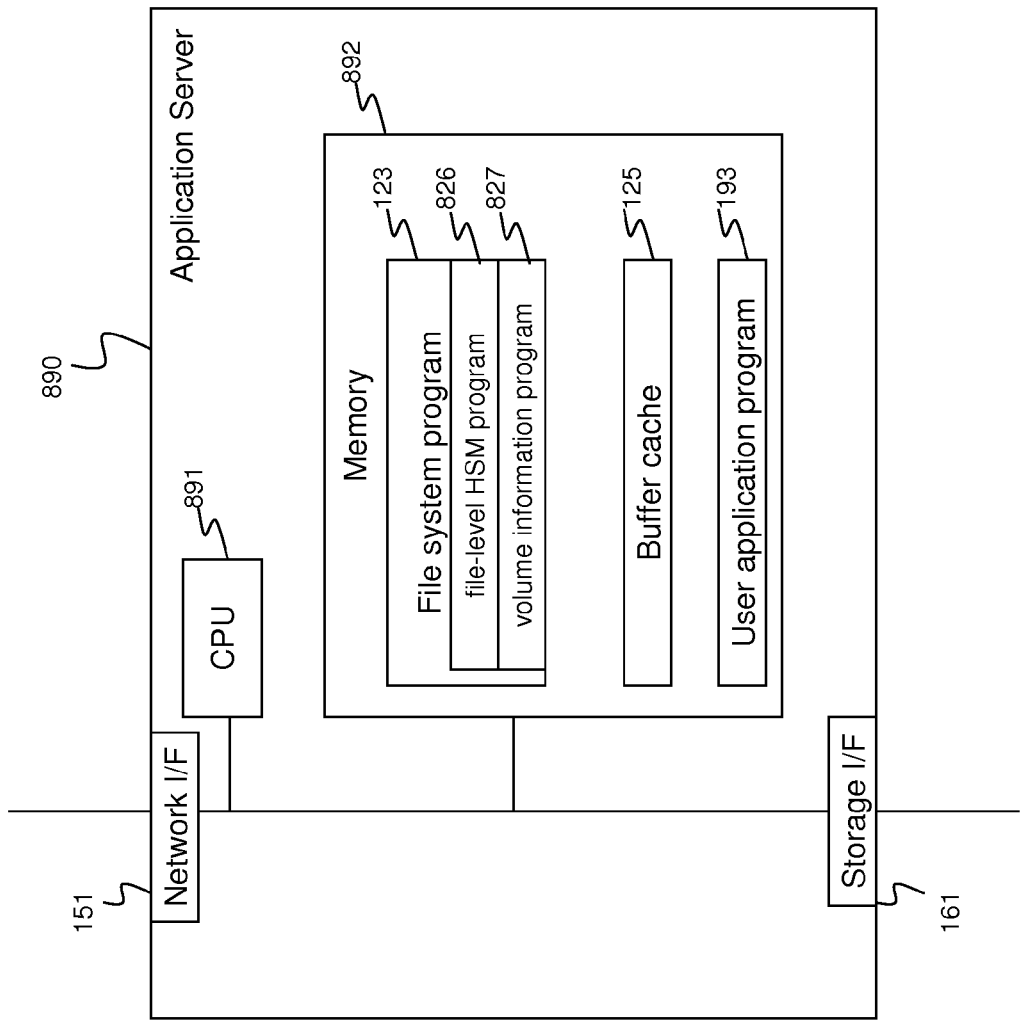

FIG. 7 shows one example of a result of tier-aware file allocation. Page 501 stores only one file "sf1" 511, and hence the allocation management program 126 moves files "sf3" 514 and "sf5" 516 to files 714 and 716 on page 501 by the flow 610 because these files all need fast storage media 117 and page 501 is actually assigned to fast storage media 117. In a similar way, the allocation management program 126 moves file "sf6" 518 to file 718 on page 505. File "sf3" 514 requires fast storage media 117 so that page 505 must have been assigned to fast storage media 117 but now file "sf3" 714 is on page 501 and page 505 can be assigned to medium-speed storage media 117.

Furthermore, the allocation management program 126 moves large files "lf1" 513 and "lf2" 517 to files 713 and 717 to align to page boundaries by the flow 620. As a result, page 503 is completely occupied by file "lf1" 713 and pages 506 and 507 are occupied by file "lf2" 717. Thus, the allocation management program 126 delegates the assignment of these pages 503, 506 and 507 to the page management program 115. As a result of this process, each small file is allocated on appropriate storage media 117, sub-file (meaning "per-page") tiered storage management for large files are executed, and thus the effectiveness of tiered storage management is improved.

II. Second Embodiment

A. System Configuration

FIGS. 8(*a*) and 8(*b*) illustrate an example of a hardware configuration of an information system 800 in which the method and apparatus of the invention may be applied according to a second embodiment of the invention. The storage system 870 of FIG. 8(*a*) is almost the same as the storage system 170 of FIG. 1(*a*), but the file server 820 of FIG. 8(*b*) is different from the file server 120 of the storage system 170 of FIG. 1(*b*). The file server 820 has the file-level HSM (Hierarchical Storage Management) program 826 and volume information program 827 in its memory 822 instead of the allocation management program 126 of the file server 120.

FIGS. 8(*c*) and 8(*d*) show another example of a hardware configuration of an information system 801. The file server 880 of the storage system 871 in FIG. 8(*d*) also has the file-level HSM program 826 in its memory 882 instead of the allocation management program 126 of the file server 180 in FIG. 1(*e*).

FIGS. 8(*e*) and 8(*f*) show another example of a hardware configuration of an information system 802. The application server 890 of the information system 802 in FIG. 8(*f*) also has the file-level HSM program 826 in its memory 892 instead of the allocation management program 126 of the application server 190 in FIG. 1(*g*).

The following description of the second embodiment is based on the information system 800 of FIGS. 8(*a*) and 8(*b*) but the second embodiment is also adaptable for the other two information systems 801 and 802.

B. File-level HSM

File-level HSM (Hierarchical Storage Management) is a functionality to realize tiered storage management. As opposed to page-based tiered storage management, which is done in the volume layer by the storage apparatus, file-level HSM is done in the file system layer by the file server. The file server capable of file-level HSM can provide a unified file tree view of many files that are really stored in different storage media 117. U.S. Pat. No. 7,330,950 discloses an implementation of such a file-level HSM.

Figure 9:
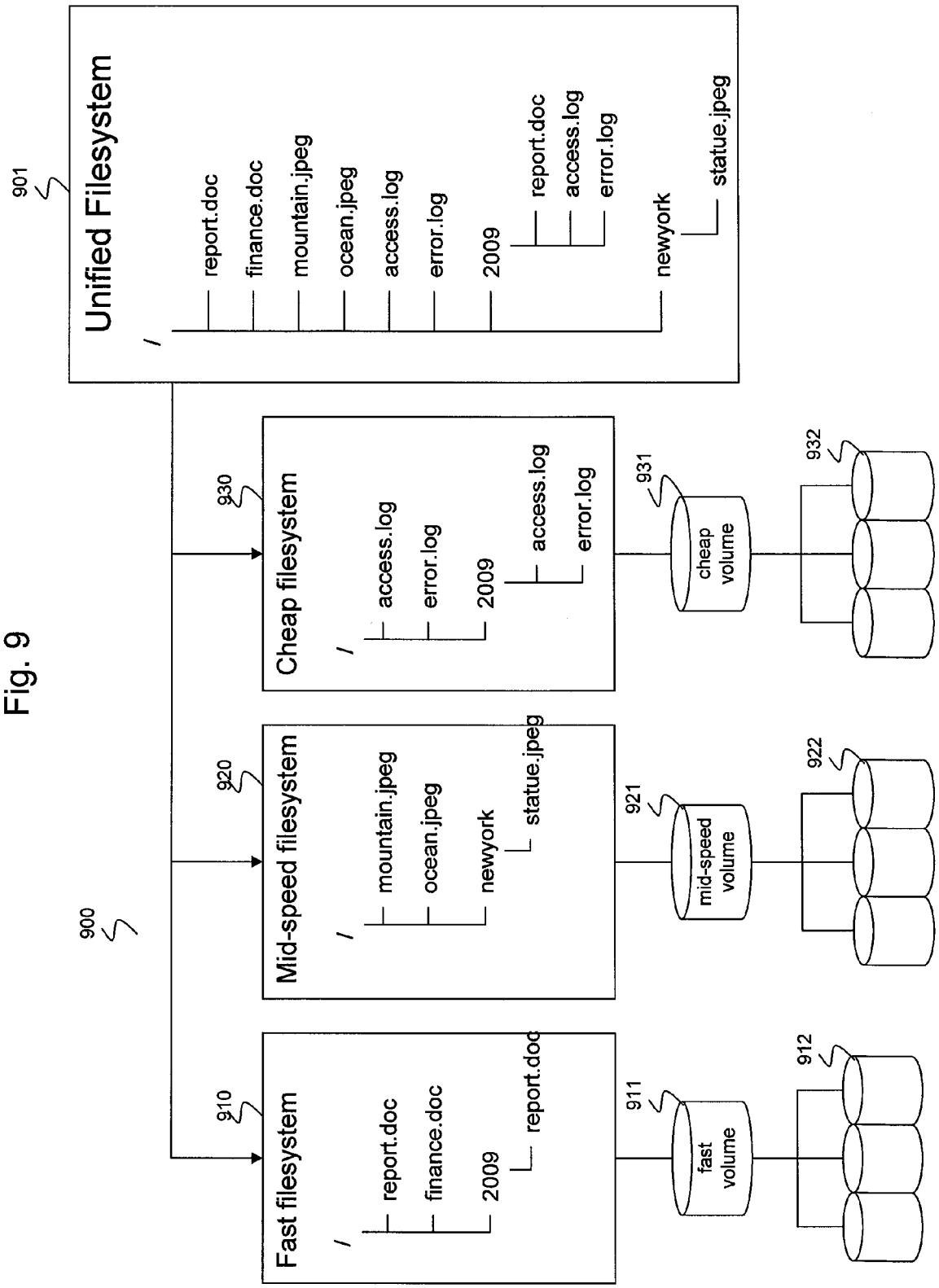
FIG. 9 shows an example of file-level HSM.

FIG. 9 shows an example of file-level HSM 900. This example file-level HSM 900 includes three volumes 911, 921 and 931. A file system tree 910 is created on the fast volume 911 consisting of fast storage media 912, a file system tree 920 on mid-speed volume 921 consisting of mid-speed storage media 922, and a file system tree 930 on slow volume 930 consisting of slow (but cheap) storage media 932. The file-level HSM program 826 shows a unified filesystem 901. This unified filesystem 901 includes all files in the file system trees 910, 920 and 930. In this situation, even when files move among file system trees without changing path names or file names, the unified filesystem 901 is unchanged. Thus, this characteristic enables per-file tiered storage management because the file-level HSM program 826 can move files to the appropriate file system on the appropriate volume. These file movements between filesystems are called "migration."

File-level HSM has good and bad points. File-level HSM works well for files that are smaller than the page size because it does not take so much time for migration. However, large files are hard to migrate because much data must be copied between volumes and it takes much time. Furthermore, even if the access frequency inside a large file is different among different sectors, the entire data is located on the same volume.

C. Cooperation of File-level HSM and Page-Based TSM

Figure 10:
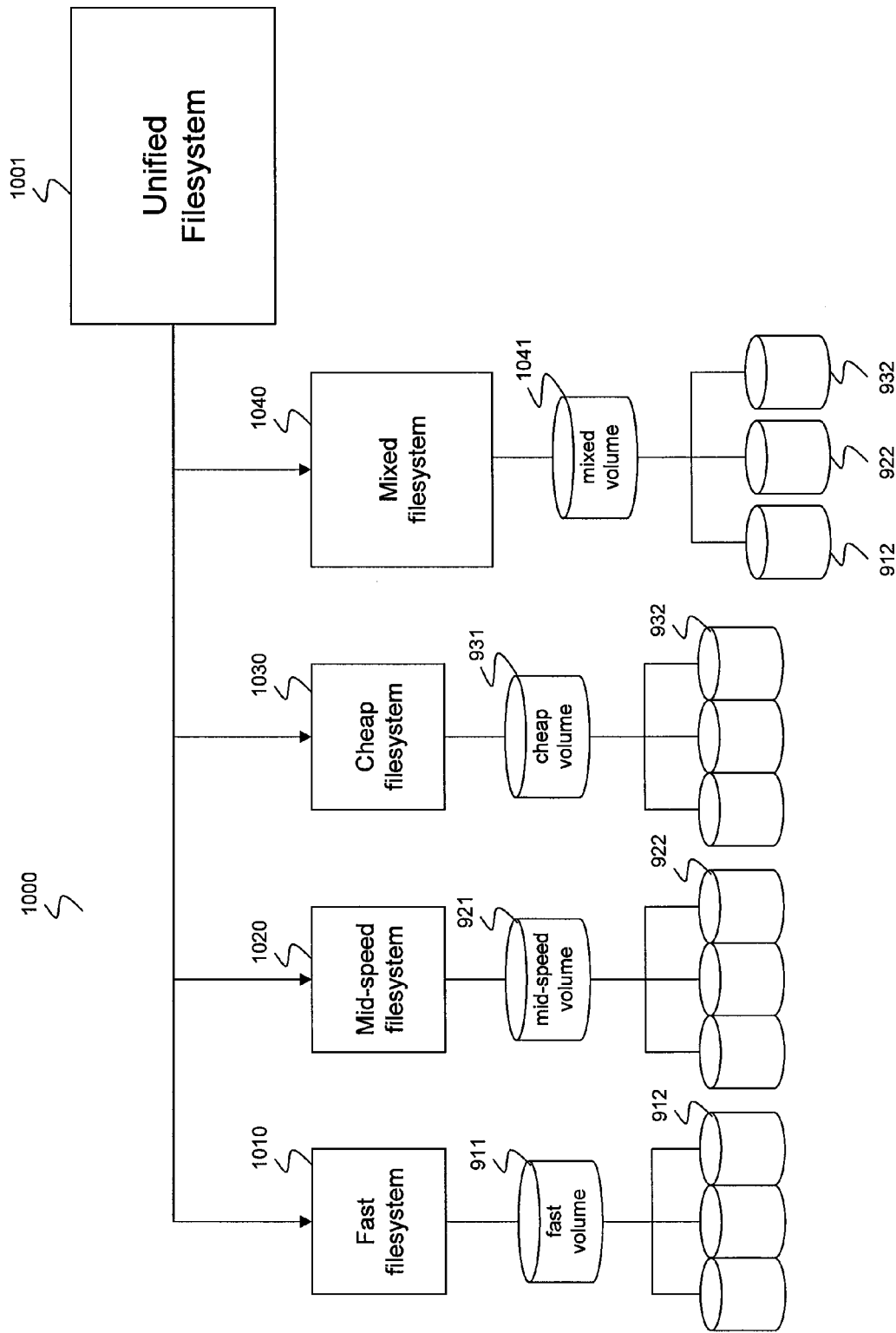
FIG. 10 shows an example file-level HSM with page-based TSM.

This embodiment reveals a method for the cooperation of file-level HSM and page-based TSM. In FIG. 10, an example file-level HSM with page-based TSM 1000 shows the cooperation configuration. The unified filesystem 1001 unified the fast filesystem 1010, mid-speed filesystem 1020, cheap filesystem 1030 just as in the example file-level HSM 900 and the mixed filesystem 1040 as well. The mixed filesystem 1040 is constructed on a mixed volume 1041 which has a variety of storage media 912, 922 and 932. The storage apparatus 110 serves the mixed volumes 1041 to the file server 820 with page-based TSM.

Figure 11:
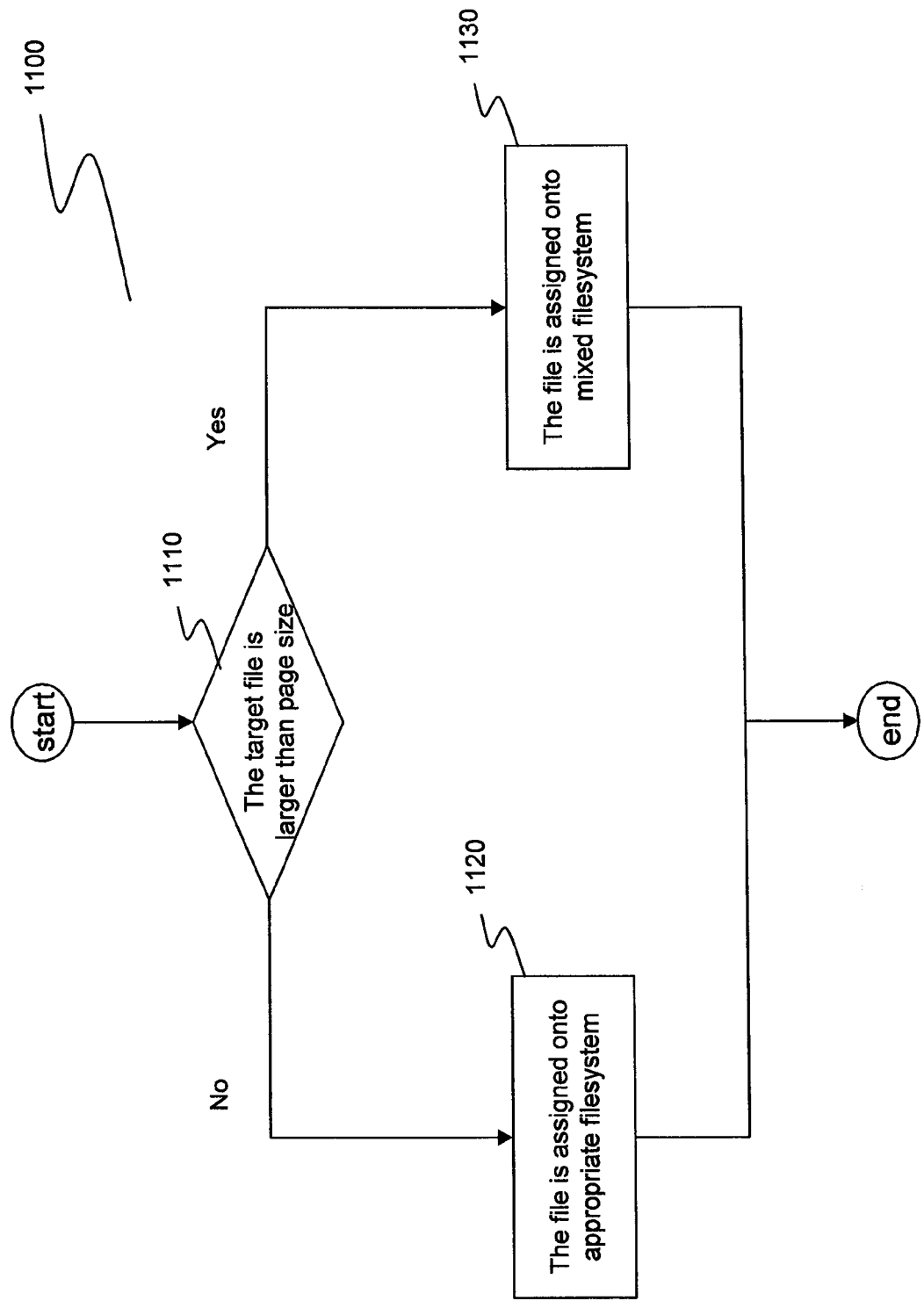
FIG. 11 shows an example of a flow diagram illustrating a process of the file-level HSM program.

In this configuration, the volume information program 827 communicates with the page management program 115 in the storage apparatus 110 and gets the volume characteristics including the volume speed as being fast, slow, mixed and so on. Using this information, the file-level HSM program 826 executes the flow 1100 shown in FIG. 11 when some events such as file creation or file write occur, periodically or at some other timing. First, the file-level HSM program 826 checks the target file if the file is larger than the page size or not (step 1110). When the file is smaller than page size, the file-level HSM program 826 assigns and moves the file on appropriate volume except the mixed volume as the file-level HSM program 826 originally (step 1120). For example, the file-level HSM program 826 assigns frequently accessed files on the fast volume 911. When the file is larger than the page file, the file-level HSM program 826 moves the file onto the mixed volume 1041 (step 1130). When the mixed volume 1041 is realized by using page-based TSM functionality, sub-file TSM is automatically adapted for the file by the storage apparatus 110 without any additional process by the file server 880.

Figure 12:
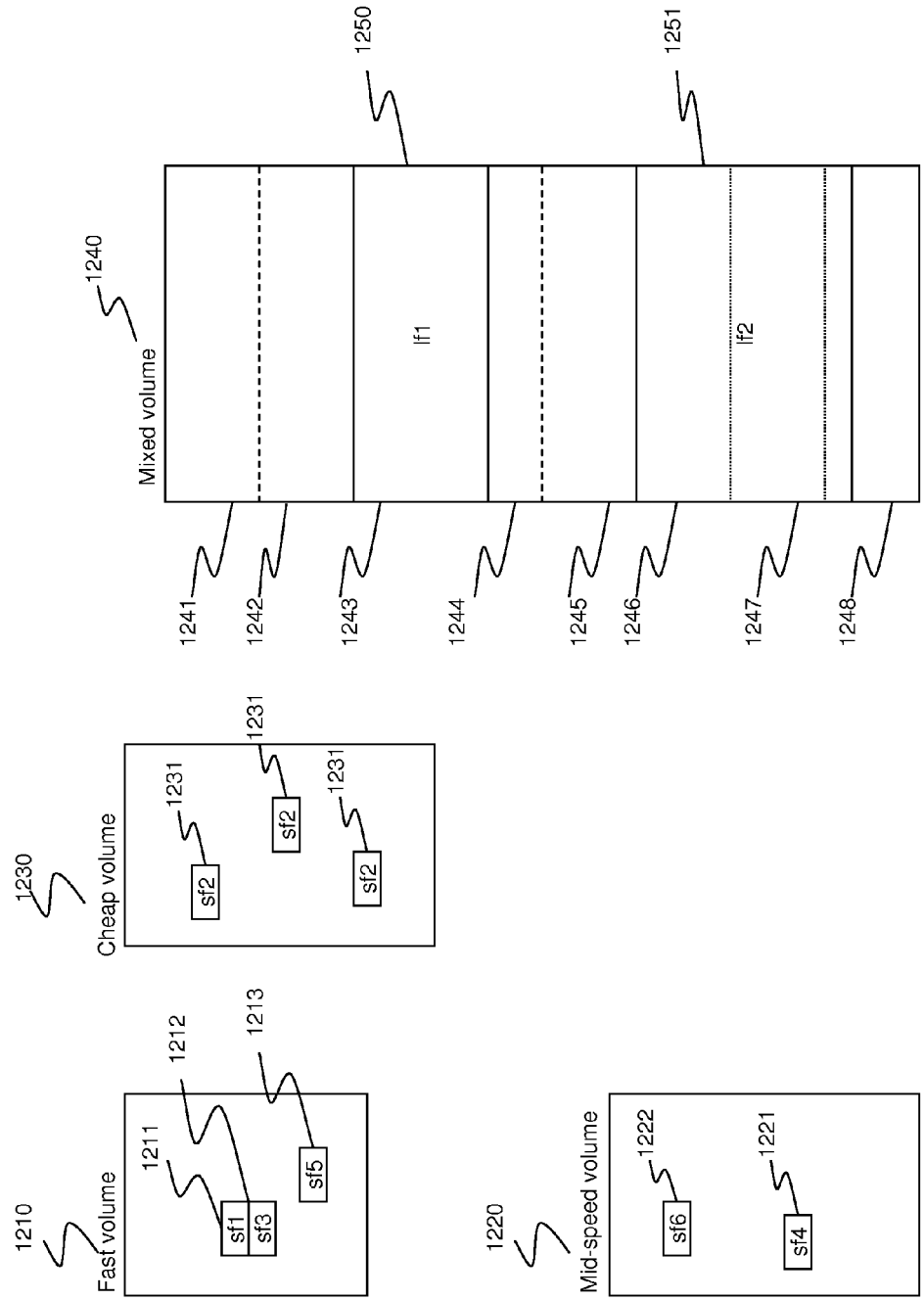
FIG. 12 shows one example of a result of the process of the file-level HSM program.

FIG. 12 shows one example 1200 of a result of the process flow 1100 of the file-level HSM program adapted for the volume 500. After the flow 1100, files "sf1" 511, "sf3" 514 and "sf5" 516, which require high performance, are stored on the fast volume 1210 as files 1211, 1212 and 1213. Files "sf4" 515 and "sf6" 518, which are sometimes accessed, are stored on the mid-speed volume 1220 as files 1221 and 1222. Files "sf2" 512, which are seldom accessed, are stored on the slow (but cheap) volume 1230 as files 1231. The large files "lf1" 513 and "lf2" 517 are stored on the mixed-volume 1240 as files 1250 and 1251. These large files 1250 and 1251 are adapted sub-file TSM by page-based TSM functionality of the storage apparatus 110. Using this invention, each small file is stored in appropriate storage media 117 and sub-file TSM is adapted for large files.

Of course, the system configurations illustrated in FIGS. 1 and 8 are purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for controlling the page and file allocation to each storage media at the storage system. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A method of managing data location of a plurality of files in a storage system having a mixed volume which includes a plurality of pages having a fixed page size, the pages belonging to different tiers, the method comprising:
   mapping the pages of different tiers to storage devices of different speeds in the storage system, the storage devices of different speeds including at least a high speed storage device corresponding to a high tier page and a low speed storage device corresponding to a low tier page; and
   for each file that is a large file which is larger in size than the page size, performing sub-file tiered management on the large file to assign the large file among pages of different tiers according to access characteristics of different portions of the large file by matching the access characteristics of each portion of the large file with a corresponding tier of the assigned page of the mixed volume.

2. The method according to claim 1, further comprising:
   for each file that is a small file which is not larger in size than the page size, assigning the small file to a page of the plurality of pages which belongs to a corresponding tier that matches the access characteristics of the small file.

3. The method according to claim 1, wherein the storage system further has a plurality of specific speed volumes including at least one high speed volume and at least one low speed volume, the method further comprising:
   mapping each high speed volume to one or more high speed storage devices;
   mapping each low speed volume to one or more low speed storage devices; and
   for each file that is a small file which is not larger in size than the page size, assigning the small file to a specific speed volume by matching the access characteristics of the small file with a corresponding speed of the specific speed volume.

4. The method according to claim 3, wherein the plurality of specific speed volumes include at least one medium speed volume, the method further comprising:

mapping each medium speed volume to one or more medium speed storage devices.

5. The method according to claim 1,
wherein the plurality of storage devices include at least one medium speed storage device, and
wherein mapping the pages of different tiers to storage devices of different speeds in the storage system include mapping at least one page to a medium speed storage device.

6. The method according to claim 1,
wherein the access characteristics comprise access frequency; and
wherein matching the access characteristics of each portion of the large file with a corresponding tier of the assigned page of the mixed volume comprises matching high access frequency with a corresponding high tier page which is mapped to a high speed storage device, and matching low access frequency with a corresponding low tier page which is mapped to a low speed storage device.

7. The method according to claim 1, further comprising:
determining whether the files are small files or large files.

8. In a system including a host coupled with a storage system for managing data location of a plurality of files in the storage system having a mixed volume which includes a plurality of pages having a fixed page size, the pages belonging to different tiers, the storage system comprising:
a plurality of storage devices of different speeds including at least a high speed storage device corresponding to a high tier page in the mixed volume and a low speed storage device corresponding to a low tier page in the mixed volume;
a mixed volume including a plurality of pages of different tiers; and
a file server having a processor and a memory, and being configured to map the pages of different tiers to map the pages of different tiers to storage devices of different speeds in the storage system; and for each file that is a large file which is larger in size than the page size, perform sub-file tiered management on the large file to assign the large file among pages of different tiers according to access characteristics of different portions of the large file by matching the access characteristics of each portion of the large file with a corresponding tier of the assigned page of the mixed volume.

9. The storage system according to claim 8, wherein the file server includes an allocation management module which is configured to,
for each file that is a small file which is not larger in size than the page size, assign the small file to a page of the plurality of pages which belongs to a corresponding tier that matches the access characteristics of the small file.

10. The storage system according to claim 8, wherein the storage system further has a plurality of specific speed volumes including at least one high speed volume and at least one low speed volume; and wherein the file server includes a file-level hierarchical storage management module which is configured to
map each high speed volume to one or more high speed storage devices;
map each low speed volume to one or more low speed storage devices; and
for each file that is a small file which is not larger in size than the page size, assign the small file to a specific speed volume by matching the access characteristics of the small file with a corresponding speed of the specific speed volume.

11. The storage system according to claim 10, wherein the plurality of specific speed volumes include at least one medium speed volume; and wherein the file-level hierarchical storage management module is configured to map each medium speed volume to one or more medium speed storage devices.

12. The storage system according to claim 8,
wherein the plurality of storage devices include at least one medium speed storage device, and
wherein mapping the pages of different tiers to storage devices of different speeds in the storage system include mapping at least one page to a medium speed storage device.

13. The storage system according to claim 8,
wherein the access characteristics comprise access frequency; and
wherein matching the access characteristics of each portion of the large file with a corresponding tier of the assigned page of the mixed volume comprises matching high access frequency with a corresponding high tier page which is mapped to a high speed storage device, and matching low access frequency with a corresponding low tier page which is mapped to a low speed storage device.

14. The storage system according to claim 8, wherein the file server is configured to
determine whether the files are small files or large files.

15. A computer-readable storage medium storing a plurality of instructions for controlling a data processor to manage data location of a plurality of files in a storage system having a mixed volume which includes a plurality of pages having a fixed page size, the pages belonging to different tiers, the storage system having a plurality of storage devices of different speeds including at least a high speed storage device corresponding to a high tier page in the mixed volume and a low speed storage device corresponding to a low tier page in the mixed volume, the plurality of instructions comprising:
instructions that cause the data processor to map the pages of different tiers to map the pages of different tiers to storage devices of different speeds in the storage system; and
instructions that, for each file that is a large file which is larger in size than the page size, cause the data processor to perform sub-file tiered management on the large file to assign the large file among pages of different tiers according to access characteristics of different portions of the large file by matching the access characteristics of each portion of the large file with a corresponding tier of the assigned page of the mixed volume.

16. The computer-readable storage medium according to claim 15, the plurality of instructions further comprise:
instructions that, for each file that is a small file which is not larger in size than the page size, cause the data processor to assign the small file to a page of the plurality of pages which belongs to a corresponding tier that matches the access characteristics of the small file.

17. The computer-readable storage medium according to claim 15, wherein the storage system further has a plurality of specific speed volumes including at least one high speed volume and at least one low speed volume; and wherein the plurality of instructions further comprise:
instructions that cause the data processor to map each high speed volume to one or more high speed storage devices;
instructions that cause the data processor to map each low speed volume to one or more low speed storage devices; and instructions that cause the data processor, for each file that is a small file which is not larger in size than the page size, to assign the small file to a specific speed volume by matching the access characteristics of the small file with a corresponding speed of the specific speed volume.

18. The computer-readable storage medium according to claim 15,
wherein the plurality of storage devices include at least one medium speed storage device; and
wherein mapping the pages of different tiers to storage devices of different speeds in the storage system include mapping at least one page to a medium speed storage device.

19. The computer-readable storage medium according to claim 15,
wherein the access characteristics comprise access frequency; and
wherein matching the access characteristics of each portion of the large file with a corresponding tier of the assigned page of the mixed volume comprises matching high access frequency with a corresponding high tier page which is mapped to a high speed storage device, and matching low access frequency with a corresponding low tier page which is mapped to a low speed storage device.

20. The computer-readable storage medium according to claim 15, wherein the plurality of instructions comprise:
instructions that cause the data processor to determine whether the files are small files or large files.

\* \* \* \* \*